US011454425B2

(12) United States Patent
Perez et al.

(10) Patent No.: US 11,454,425 B2
(45) Date of Patent: Sep. 27, 2022

(54) AIR CYCLE MACHINES AND METHODS OF COMMUNICATING FLUID THROUGH AIR CYCLE MACHINES

(71) Applicant: Hamilton Sundstrand Corporation, Charlotte, NC (US)

(72) Inventors: Roberto J. Perez, Windsor, CT (US); Beakal T. Woldemariam, South Windsor, CT (US); Darryl A. Colson, West Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 280 days.

(21) Appl. No.: 16/810,033

(22) Filed: Mar. 5, 2020

(65) Prior Publication Data

US 2021/0278108 A1     Sep. 9, 2021

(51) Int. Cl.
*F25B 9/00* (2006.01)
*B64D 13/06* (2006.01)
*F25B 9/06* (2006.01)

(52) U.S. Cl.
CPC ............. *F25B 9/004* (2013.01); *B64D 13/06* (2013.01); *F25B 9/06* (2013.01); *B64D 2013/0603* (2013.01)

(58) Field of Classification Search
CPC . F25B 9/004; F25B 9/06; B64D 13/06; B64D 2013/0603; B64D 2013/0648
USPC ............................................................ 62/87
See application file for complete search history.

(56) References Cited

U.S. PATENT DOCUMENTS

| 4,503,683 | A  | 3/1985  | Wieland et al. |
|-----------|----|---------|----------------|
| 4,967,565 | A  | 11/1990 | Thomson et al. |
| 5,309,735 | A  | 5/1994  | Maher, Jr. et al. |
| 5,461,882 | A  | 10/1995 | Zywiak         |
| 9,783,307 | B2 | 10/2017 | Bruno et al.   |
| 10,160,546 | B2 | 12/2018 | Beers et al.  |
| 2014/0199167 | A1 | 7/2014 | Beers et al.  |

(Continued)

FOREIGN PATENT DOCUMENTS

| EP | 0664856 B1 | 4/1996 |
|----|------------|--------|
| EP | 3539875 A1 | 9/2019 |

OTHER PUBLICATIONS

European Search Report for Application No. 21160673.6, dated Jul. 28, 2021, 8 pages.

(Continued)

*Primary Examiner* — Steve S Tanenbaum
(74) *Attorney, Agent, or Firm* — Cantor Colburn LLP

(57) ABSTRACT

An air cycle machine includes a housing, a scavenging turbine, and an ambient air fan. The housing has an exterior wall defining an overboard air inlet, an ambient air inlet, and an ambient air outlet. The scavenging turbine is arranged within the housing, is supported for rotation about a rotation axis, and is in fluid communication with the overboard air inlet. The ambient air fan is arranged within the housing, is supported for rotation about the rotation axis within the housing, and has a radially inner spoked portion and radially outer bladed portion. The bladed portion of the ambient air fan fluidly couples the ambient air inlet to the ambient air outlet and the spoked portion of the ambient air fan fluidly couples the scavenging turbine to the ambient air fan within the housing. Environmental control systems and fluid communication methods are also described.

20 Claims, 5 Drawing Sheets

(56) References Cited

U.S. PATENT DOCUMENTS

| | | | |
|---|---|---|---|
| 2016/0231031 A1* | 8/2016 | Bruno | F02C 7/141 |
| 2017/0167292 A1 | 6/2017 | Army et al. | |
| 2017/0167541 A1* | 6/2017 | Army | F01D 25/125 |
| 2021/0278107 A1 | 9/2021 | Colson et al. | |

OTHER PUBLICATIONS

Extended European Search Report for International Application No. 21158493.3 dated Jul. 12, 2021, 35 pages.

\* cited by examiner

AIR CYCLE MACHINES AND METHODS OF COMMUNICATING FLUID THROUGH AIR CYCLE MACHINES

BACKGROUND

The present disclosure is generally related to environmental control, and more particularly to air cycle machines for environmental control systems such as on vehicles.

Vehicles, such as aircraft, commonly employ environmental control systems with air cycle machines to provide conditioned air to environmentally controlled spaces on the vehicle. Such air cycle machines generally provide conditioned air using an air cycle conditioning process, typically by successively cooling, compressing, further cooling, and thereafter expanding the compressed air. Once conditioned the air is routed to the environmentally controlled spaces on the vehicle, where the conditioned air renews the atmosphere within the space by displacing a portion of the atmosphere from the space.

In some applications the overboard air flow displaced by the conditioned air is pressurized relative to the external environment external to the vehicle. In such applications a scavenging turbine can be employed to extract work from the overboard air flow prior to return of the overboard air flow environment external to the vehicle, limiting the energy required to operate the air cycle machine and improving efficiency of the air cycle machine. Routing the overboard air flow to and from the scavenging turbine is typically accomplished with external ducting. The external ducting is typically arranged outside the air cycle machine to route the overboard airflow exiting the scavenging turbine to an ambient air duct located within the air cycle machine.

Such systems and methods have generally been suitable for their intended purpose. However, there remains a need in the art for improved air cycle machines, environmental control systems, and methods of communicating fluid within air cycle machines.

BRIEF DESCRIPTION

An air cycle machine is provided. The air cycle machine includes a housing with an exterior wall defining therethrough an overboard air inlet, an ambient air inlet, and an ambient air outlet, a scavenging turbine arranged within the housing and supported for rotation about a rotation axis and in fluid communication with the overboard air inlet, and an ambient air fan. The ambient air fan is arranged within the housing, is supported for rotation about the rotation axis within the housing, and has a radially inner spoked portion and radially outer bladed portion. The bladed portion fluidly couples the ambient air inlet to the ambient air outlet and the spoked portion fluidly couples the scavenging turbine to the ambient air fan within the housing.

In addition to one or more of the features described above, or as an alternative, further examples of the air cycle machine may include that the ambient air fan includes an annular portion extending about the rotation axis, the radially outer bladed portion extending radially outward from the annular portion of the ambient air fan.

In addition to one or more of the features described above, or as an alternative, further examples of the air cycle machine may include a fan housing seated in the housing along the rotation axis and supporting the ambient air fan, the fan housing extending circumferentially about the radially outer bladed portion of the ambient air fan.

In addition to one or more of the features described above, or as an alternative, further examples of the air cycle machine may include that the fan housing defines an ambient air channel fluidly coupling ambient air inlet of the housing to the ambient air outlet of the housing, the radially outer bladed portion of the ambient air fan rotatably disposed within the ambient air channel.

In addition to one or more of the features described above, or as an alternative, further examples of the air cycle machine may include that the fan housing defines a turbine exhaust channel fluidly coupling the scavenging turbine to the ambient air outlet, the spoked portion of the ambient air fan rotatably disposed within the turbine exhaust channel.

In addition to one or more of the features described above, or as an alternative, further examples of the air cycle machine may include that the ambient air fan is fixed in rotation relative to the scavenging turbine.

In addition to one or more of the features described above, or as an alternative, further examples of the air cycle machine may include that the housing has an interior wall defining therethrough a turbine-fan port, the turbine-fan port fluidly coupling the scavenging turbine to the ambient air fan.

In addition to one or more of the features described above, or as an alternative, further examples of the air cycle machine may include that the interior wall divides an interior of the housing into a turbine chamber and a fan chamber, the turbine-fan port fluidly coupling the turbine chamber with the fan chamber.

In addition to one or more of the features described above, or as an alternative, further examples of the air cycle machine may include that the scavenging turbine is arranged within the turbine chamber.

In addition to one or more of the features described above, or as an alternative, further examples of the air cycle machine may include that the ambient air fan is arranged within the fan chamber.

In addition to one or more of the features described above, or as an alternative, further examples of the air cycle machine may include a shaft arranged within the housing and connecting the scavenging turbine to the ambient air fan.

In addition to one or more of the features described above, or as an alternative, further examples of the air cycle machine may include an expansion turbine arranged in the housing and fixed in rotation relative to the ambient air fan by the shaft.

In addition to one or more of the features described above, or as an alternative, further examples of the air cycle machine may include a compressor arranged within the housing and fixed in rotation relative to the ambient air fan by the shaft.

In addition to one or more of the features described above, or as an alternative, further examples of the air cycle machine may include an overboard air duct connected to the overboard air inlet defined by the exterior wall of the housing.

In addition to one or more of the features described above, or as an alternative, further examples of the air cycle machine may include that the air cycle machine has no ducting external to the housing fluidly coupling the scavenging turbine to the ambient air fan.

In addition to one or more of the features described above, or as an alternative, further examples of the air cycle machine may include that the scavenging turbine is a radial flow turbine, wherein the ambient air fan is an axial flow fan, and further comprising a bearing arrangement supporting the radial flow turbine and the axial flow fan for rotation about the rotation axis.

An environmental control system is also provided. The environmental control system includes an air cycle machine as described above, the housing has an interior wall defining therethrough a turbine-fan port, the turbine-fan port fluidly coupling the scavenging turbine to the ambient air fan; and wherein the air cycle machine has no ducting external to the housing fluidly coupling the scavenging turbine to the ambient air fan.

In addition to one or more of the features described above, or as an alternative, further examples of the environmental control system may include an expansion turbine arranged in the housing and fixed in rotation relative to the ambient air fan and a compressor arranged within the housing and fixed in rotation relative to the ambient air fan.

In addition to one or more of the features described above, or as an alternative, further examples of the environmental control system may include that the an environmentally controlled space fluidly coupled to the overboard air inlet defined by the housing of the air cycle machine and a compressed air source fluidly coupled by the environmentally controlled space by the overboard air inlet.

A fluid communication method is additionally provided. The method includes, at an air cycle machine as described above, receiving an overboard air flow at the overboard air inlet, receiving an ambient air flow at the ambient air inlet, and extracting work from the overboard air flow with the scavenging turbine. The ambient air fan is rotated using the work extracted by the scavenging turbine, the ambient air flow received at the ambient air inlet driven to the ambient air outlet with the radially outer bladed portion of the ambient air fan, and the overboard air flow communicated to the ambient air outlet through the radially inner spoked portion of the ambient air fan.

Technical effects of the present disclosure include air cycle machines that allow the use of turbines that exhaust directly into the ambient air fan circuit of the air cycle machine. In certain examples the present disclosure provides air cycle machines having relatively small rotative assembly length, allowing relatively higher speed operation and/or increased shaft system bending mode. In accordance with certain examples the present disclosure provides air cycle machines with relatively efficient turbine outlets and relatively small numbers of ducts and duct length. It is also contemplated that, in accordance with certain examples, air cycle machines described herein have relatively small size and/or which are lightweight.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
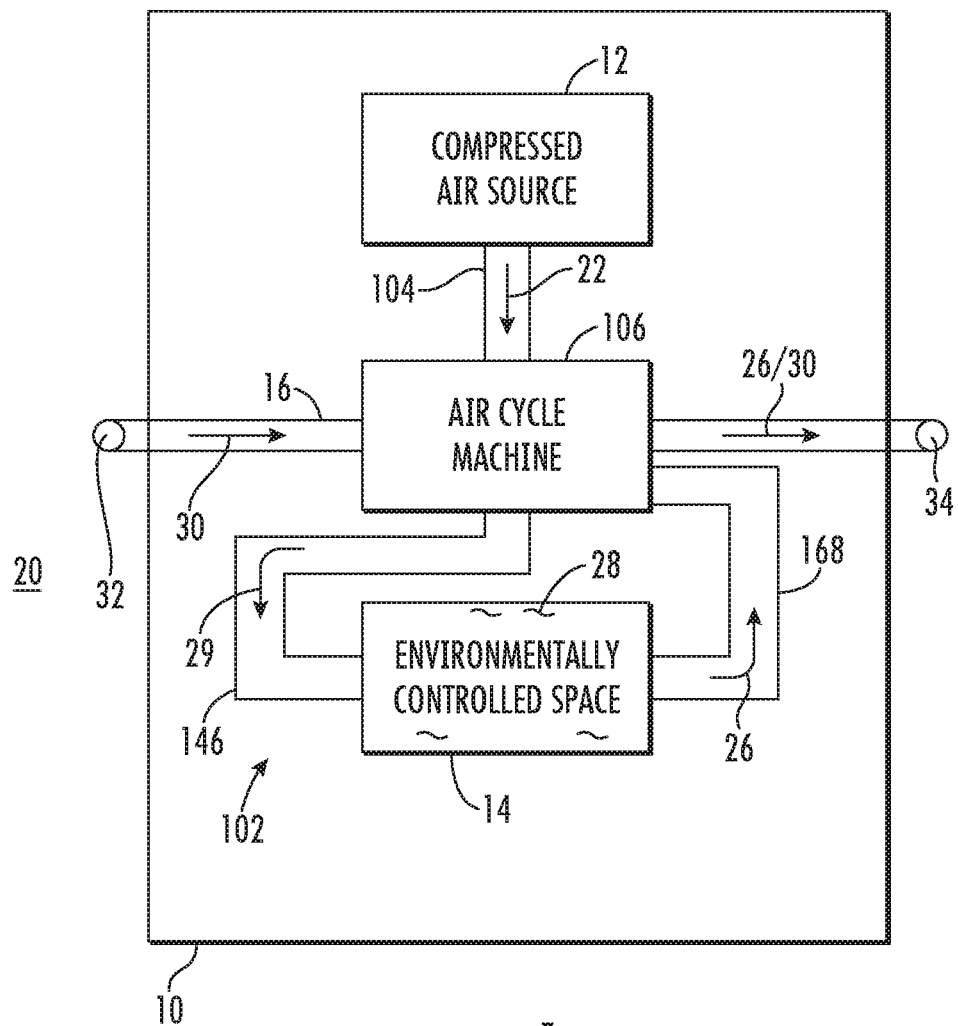
FIG. 1 is a schematic view of an environmental control system having an air cycle machine constructed in accordance with the present disclosure, showing the environmental control system providing a conditioned air flow to an environmentally controlled space on a vehicle.

Reference will now be made to the drawings wherein like reference numerals identify similar structural features or aspects of the subject disclosure. For purposes of explanation and illustration, and not limitation, a partial view of an example of an air cycle machine in accordance with the disclosure is shown in FIG. 1 and is designated generally by reference character 100. Other embodiments of air cycle machines, environmental control systems, and methods of communicating fluid within air cycle machines are provided in FIGS. 2-5, as will be described. The systems and methods described herein can be used for conditioning air for environmentally controlled spaces, such as with bleed air from gas turbine engine compressors to supply conditioned air to environmentally controlled spaces on aircraft, though the present disclosure is not limited to any particular source of compressed air or to aircraft in general.

Referring to FIG. 1, a vehicle 10, e.g., an aircraft, is shown. The vehicle 10 includes an environmental control system 102, a compressed air source 12, an environmentally controlled space 14, and an ambient air duct 16. The environmental control system 102 includes a compressed air duct 104, conditioned air duct 106, and an overboard air duct 108.

The compressed air duct 104 fluidly couples the compressed air source 12 to the air cycle machine 100. The air cycle machine 100 fluidly couples the compressed air duct 104 to the conditioned air duct 106 and is in fluid communication with the ambient air duct 16. The conditioned air duct 106 fluidly couples the air cycle machine 100 to the environmentally controlled space 14. The environmentally controlled space 14 fluidly couples the conditioned air duct 106 to the overboard air duct 108, the overboard air duct 108 in turn being fluidly coupled to the ambient air duct 16 by the air cycle machine 100. As shown and described herein the compressed air source 12 is a compressor section of a gas turbine engine, e.g., an aircraft main engine or auxiliary power unit, and the environmentally controlled space 14 is a crew or passenger cabin contained within an aircraft fuselage. This is for illustration purposes only and is non-limiting. As will be appreciated by those of skill in the art in view of the present disclosure, air cycle machines and environmental control systems employed in other applications can also benefit from the present disclosure, such as in terrestrial and marine applications by way of non-limiting examples.

During operation the compressed air source 12 communicates a compressed air flow 22, e.g., a bleed air flow, to the air cycle machine 100 via the compressed air duct 104. The air cycle machine 100 conditions the compressed air flow 22 to generate a conditioned air flow 24, which the air cycle machine 100 communicates to the environmentally controlled space 14 via the conditioned air duct 106. Introduction of the conditioned air flow 24 into the environmentally controlled space 14 displaces an overboard air flow 26 from the environmentally controlled space 14, operation of the air cycle machine 100 thereby maintaining a conditioned atmosphere 28 within the environmentally controlled space 14. The overboard air flow 26 issues from the environmentally controlled space 14 via the overboard air duct 108, the overboard air duct 108 communicating the overboard air flow 26 to the air cycle machine 100.

The air cycle machine 100 is arranged to scavenge power for operation of the air cycle machine 100 prior to communicating the overboard air flow 26 to the environment 20 external to the vehicle 10. Specifically, the air cycle machine 100 scavenges power from the overboard air flow 26 according to differential in pressure between the overboard air flow 26 (and that within the interior of the environmentally controlled space 14) and the environment 20 external to the vehicle 10. It is contemplated that the air cycle machine 100 generate the conditioned air flow 24 with the assistance of an ambient air flow 30, which the ambient air duct 16 ingests from the environment 20 external to the vehicle 10, and that the air cycle machine 100 intermix the overboard air flow 26 with the ambient air flow 30 prior to issue into the environment 20 external to the vehicle 10.

As will be appreciated by those of skill in the art in view of the present disclosure, routing the overboard air flow 26 through some air cycle machines can require external ducting external to the air cycle machine housing to route the overboard air flow 26 through such air cycle machine. While generally acceptable for their intended purpose, external interconnect ducting requires assembly, must be maintained during the service life of the air cycle machine, and increases the installation and service envelop of such air cycle machines. To limit (or eliminate entirely) such external interconnect ducting the air cycle machine 100 is provided.

Figure 2:
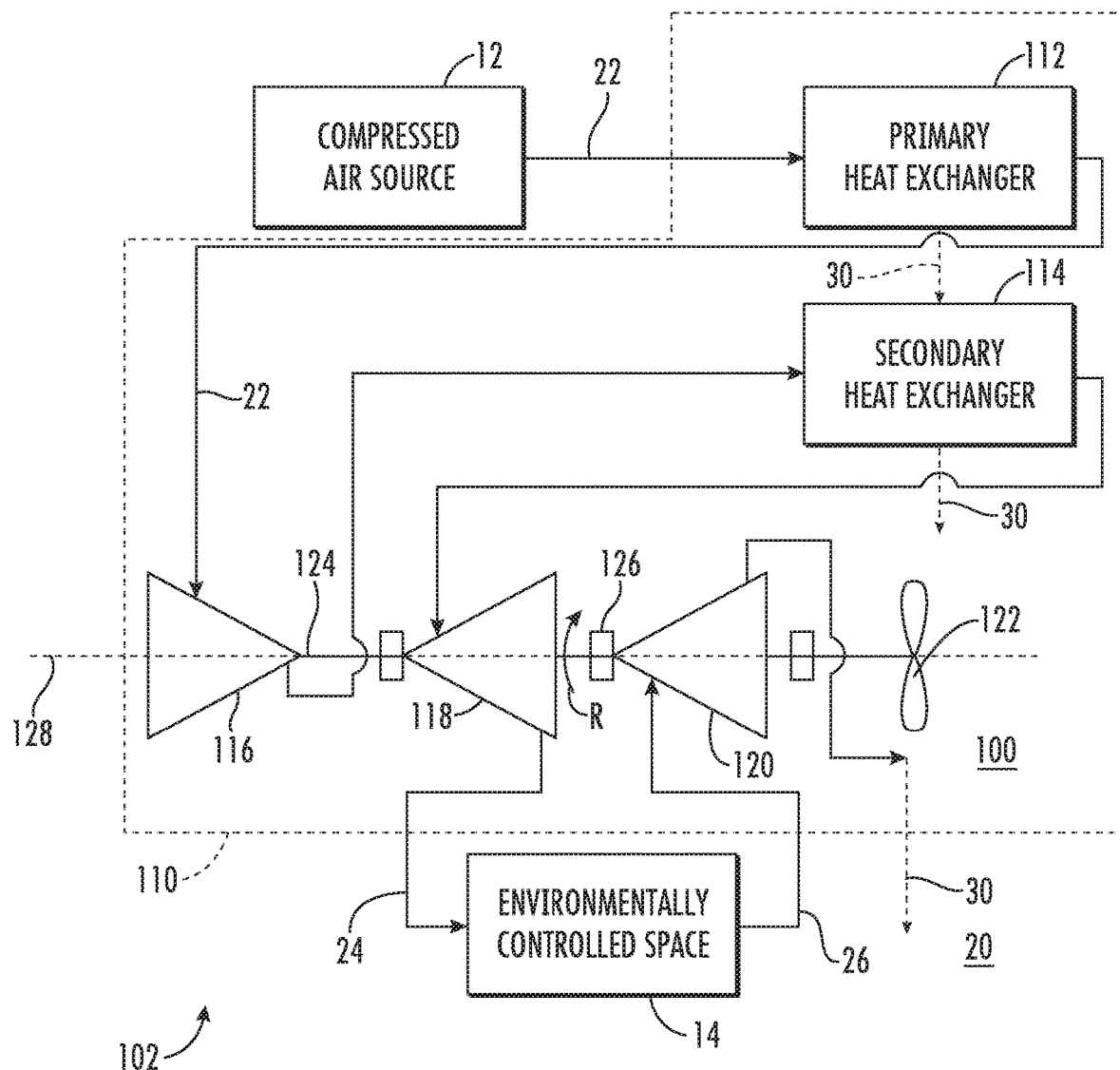
FIG. 2 is a schematic view of the environmental control system and air cycle machine of FIG. 1, showing a scavenging turbine communicating an overboard air flow received from the environmentally controlled space to an ambient air fan and therethrough the environment external to the vehicle.

With reference to FIG. 2, a portion of the environmental control system 102 including the air cycle machine 100 is shown according to an example. In the illustrated example the air cycle machine 100 includes a housing 110, a primary heat exchanger 112, a secondary heat exchanger 114, and a compressor 116. The air cycle machine 100 also includes an expansion turbine 118, a scavenging turbine 120, and an ambient air fan 122. The air cycle machine 100 further includes a shaft 124 and a bearing arrangement 126.

The compressed air duct 104 (shown in FIG. 1) fluidly couples the compressed air source 12 (shown in FIG. 1) to the primary heat exchanger 112. The primary heat exchanger 112 fluidly couples the compressed air duct 104 to the compressor 116. The compressor 116 fluidly couples the primary heat exchanger 112 to the secondary heat exchanger 114. The secondary heat exchanger 114 in turn fluidly couples the compressor 116 to the expansion turbine 118.

The expansion turbine 118 fluidly couples the secondary heat exchanger 114 to the conditioned air duct 106 (shown in FIG. 1). The conditioned air duct 106 fluidly couples the expansion turbine 118 to the environmentally controlled space 14. The environmentally controlled space 14 in turn fluidly couples the conditioned air duct 106 to overboard air duct 108 (shown in FIG. 1).

The overboard air duct 108 fluidly couples the environmentally controlled space 14 to the scavenging turbine 120. The scavenging turbine 120 fluidly couples the overboard air duct 108 to the ambient air fan 122. The ambient air fan 122 in turn fluidly couples the scavenging turbine 120 to the ambient air duct 16 (shown in FIG. 1), and therethrough to the environment 20 external to the vehicle 10 (shown in FIG. 1).

With continuing reference to FIG. 1, the ambient air duct 16 has an ambient air duct inlet 32, an ambient air duct outlet 34, and fluidly couples the ambient air duct inlet 32 to the ambient air duct outlet 34. As shown in FIG. 2, the primary heat exchanger 112, the secondary heat exchanger 114, and the ambient air fan 122 are each arranged serially along the ambient air duct 16 along the direction of fluid flow through the ambient air duct 16 between the ambient air duct inlet 32 and the ambient air duct outlet 34. In this respect the primary heat exchanger 112 is fluidly coupled to the ambient air duct inlet 32 and the secondary heat exchanger 114 is fluidly coupled the primary heat exchanger 112. In further respect the ambient air fan 122 is fluidly coupled to the secondary heat exchanger 114 and the ambient air duct outlet 34 is fluidly coupled to the ambient air fan 122.

During operation the compressed air source 12 (shown in FIG. 1) communicates the compressed air flow 22 to the compressed air duct 104 (shown in FIG. 1). The compressed air duct 104 communicates the compressed air flow 22 to the compressor 116 through primary heat exchanger 112. The primary heat exchanger 112 transfers heat from the compressed air flow 22 to the ambient air flow 30 traversing the ambient air duct 16 (shown in FIG. 1) and communicates the compressed air flow 22 to the compressor 116.

The compressor 116 compresses the compressed air flow 22 subsequent to cooling in the primary heat exchanger 112 and communicates the compressed air flow to the secondary heat exchanger 114. The secondary heat exchanger 114 transfers additional heat from the compressed air flow 22 to the ambient air flow 30 traversing the ambient air duct 16 (shown in FIG. 1). Once further cooled, the secondary heat exchanger 114 communicates the compressed air flow 22 to the expansion turbine 118.

The expansion turbine 118 expands the compressed air flow 22, cooling and extracting work from the compressed air flow 22 as the compressed air flow 22 traverses the expansion turbine 118. Once expanded the expansion turbine 118 communicates compressed air flow 22 once expanded and further cooled to the environmentally controlled space 14 via the conditioned air duct 106 (shown in FIG. 1) as the conditioned air flow 24. In certain examples the expansion turbine 118 communicates the extracted work to the ambient air fan 122 and/or the compressor 116 through the shaft 124.

Introduction of the conditioned air flow 24 into the environmentally controlled space 14 generates the overboard air flow 26 by displacing from conditioned atmosphere 28 (shown in FIG. 1) the overboard air flow 26. The overboard air flow 26 is communicated (issues) from the environmentally controlled space 14 through the overboard air duct 108. The overboard air duct 108 communicates the overboard air flow 26 to the scavenging turbine 120, which scavenges work from the overboard air flow 26 according to pressure differential between the environmentally controlled space 14 and the environment 20 external to the vehicle 10 (shown in FIG. 1). In the illustrated example the scavenging turbine 120 applies scavenged work from the overboard air flow 26 to the ambient air fan 122 via the shaft 124, rotating the ambient air fan 122 to drive the ambient air flow 30 through the ambient air duct 16 (shown in FIG. 1).

Once scavenged, i.e., expanded, the scavenging turbine 120 communicates the overboard air flow 26 to the ambient air duct 16 through the ambient air fan 122. More specifically, the scavenging turbine 120 communicates the overboard air flow 26 through the ambient air fan 122 for introduction into the ambient air flow 30 at a location fluidly downstream of the ambient air fan 122 and subsequent to traversing the ambient air fan 122. It contemplated that scavenging turbine 120 communicate the overboard air flow 26 to the ambient air duct 16 internally, i.e., within the housing 110, and without external ducting. In this respect the air cycle machine 100 has no external ducting fluidly coupling the scavenging turbine 120 to the ambient air fan 122, simplifying the arrangement of the air cycle machine 100.

The compressor 116 is operatively associated with the expansion turbine 118. Operative association of the compressor 116 with the expansion turbine 118 is via the shaft 124, which connects the expansion turbine 118 to the compressor 116 such that the compressor 116 is fixed in rotation relative to the expansion turbine 118, and communicates the work extracted by the expansion turbine 118 to the compressor 116 as mechanical rotation R. It is contemplated that the compressor 116 and the expansion turbine 118 be supported for rotation within the housing 110 by a bearing arrangement 126. In the illustrated example the ambient air fan 122 is operatively associated with the scavenging turbine 120, operative association of the ambient air fan 122 with the scavenging turbine 120 also accomplished by the shaft 124—the scavenging turbine 120 and the ambient air fan 122 support for rotation by the bearing arrangement 126 about a rotation axis 128.

Figure 3:
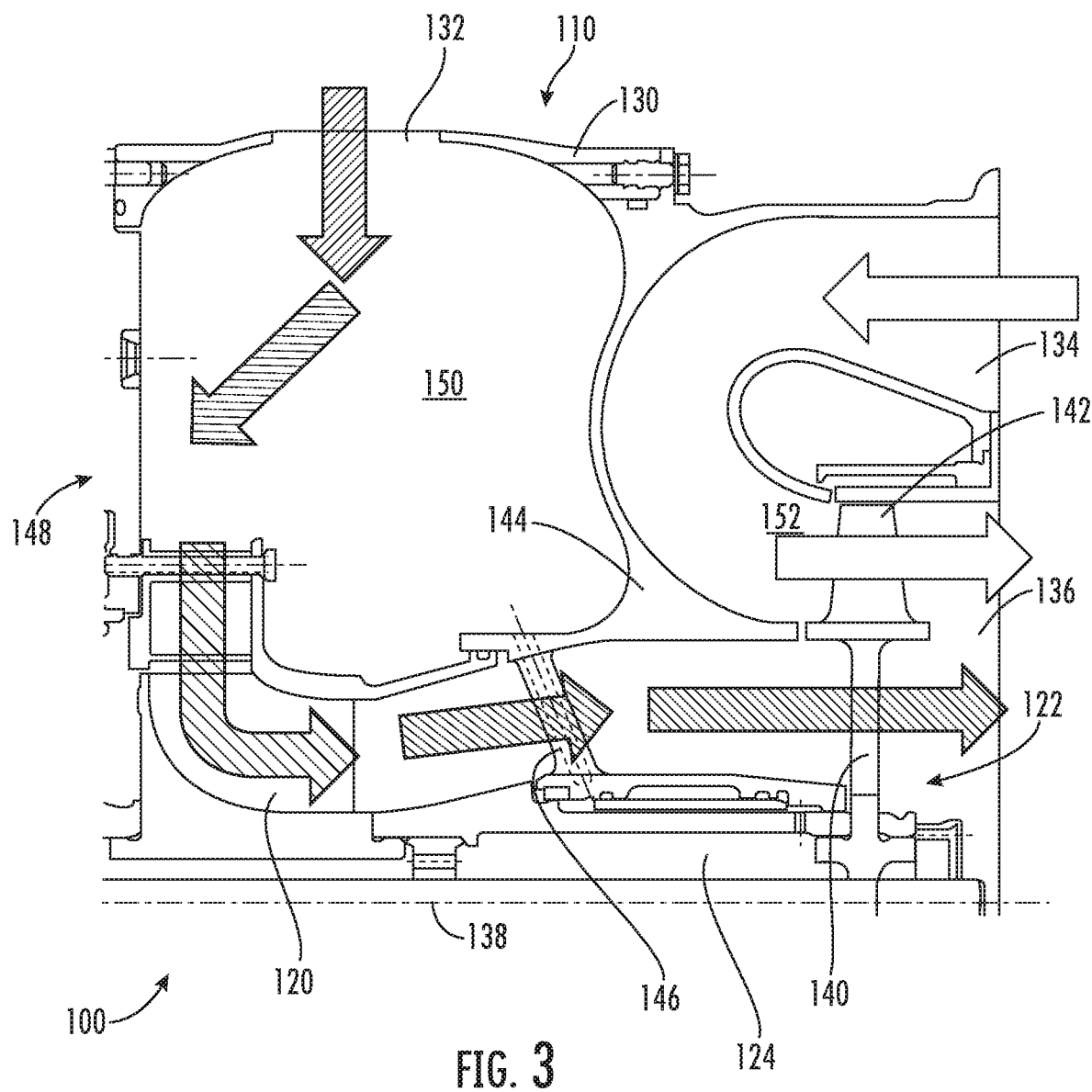
FIG. 3 is a cross-sectional view of a portion of the air cycle machine of FIG. 1 including the scavenging turbine and the ambient air fan, showing the scavenging turbine exhausting an overboard air flow through a radially inner spoked portion of the ambient air fan.

With reference to FIG. 3, a portion of the air cycle machine 100 including the scavenging turbine 120 and the ambient air fan 122 is shown. The air cycle machine 100 the housing 110, the scavenging turbine 120, and the ambient air fan 122. The housing 110 has an exterior wall 130 that defines therethrough an overboard air inlet 132, an ambient air inlet 134, and an ambient air outlet 136. The scavenging turbine 120 is arranged within the housing 110, is supported for rotation about a rotation axis 138, and is in fluid communication with the overboard air inlet 132. The ambient air fan 122 is arranged within the housing 110, is supported for rotation about the rotation axis 138, and has a radially inner spoked portion 140 and a radially outer bladed portion 142. The radially outer bladed portion 142 of the ambient air fan 122 fluidly couples the ambient air inlet 134 to the ambient air outlet 136 of the ambient air fan 122. The radially inner spoked portion 140 of the ambient air fan 122 fluidly couples the scavenging turbine 120 to the ambient air fan 122 within the housing 110.

The housing 110 has interior wall 144 defining therethrough a turbine-fan port 146. The turbine-fan port 146 fluidly couples the scavenging turbine 120 to the ambient air fan 122. The interior wall 144 divides an interior 148 of the housing 110 into a turbine chamber 150 and a fan chamber 152. The scavenging turbine 120 is supported for rotation within the turbine chamber 150 and the ambient air fan 122 is supported for rotation within the fan chamber 152.

The overboard air duct 108 (shown in FIG. 1) is fluidly coupled to the overboard air inlet 132 and therethrough to the radially inner spoked portion 140 of the ambient air fan 122 through the turbine chamber 150, the scavenging turbine 120, and the turbine-fan port 146. The fan chamber 152 is arranged along the ambient air duct 16 and in this respect primary heat exchanger 112 and secondary heat exchanger 114 are fluidly coupled to the ambient air inlet 134, and therethrough the ambient air outlet 136 through the fan chamber 152 and the radially outer bladed portion 142 of the ambient air fan 122. In certain examples the scavenging turbine 120 is a radial flow turbine, which provides an axially compact arrangement to the air cycle machine 100. In accordance with certain examples the ambient air fan 122 is an axial flow fan, also providing an axially compact arrangement to the air cycle machine 100.

The shaft 124 is arranged within the housing 110 and connects the scavenging turbine 120 to the ambient air fan 122. More specifically, the shaft 124 connects the scavenging turbine 120 to the ambient air fan 122 that the scavenging turbine 120 is fixed in rotation relative to the ambient air fan 122. For example, in certain examples the scavenging turbine 120 and the ambient air fan 122 are fixed in rotation such that the scavenging turbine 120 and the ambient air fan 122 rotate in concert with one another at a common rotational speed. In accordance with certain examples, the scavenging turbine 120 and the ambient air fan 122 can rotate in concert with one another at a common speed ratio, e.g., via connection through an intermediate gear arrangement.

In the certain examples the expansion turbine 118 (shown in FIG. 2) is arranged within the housing 110 and is fixed in rotation relative to the ambient air fan 122 by the shaft 124. In accordance with certain examples the compressor 116 (shown in FIG. 2) is arranged within the housing 110 and is fixed in rotation relative to the ambient air fan 122 by the shaft 124. It is also contemplated that, in accordance with certain examples, both the compressor 116 and the expansion turbine 118 can be arranged within the housing 110 and fixed in rotation relative to the shaft 124.

Figure 4:
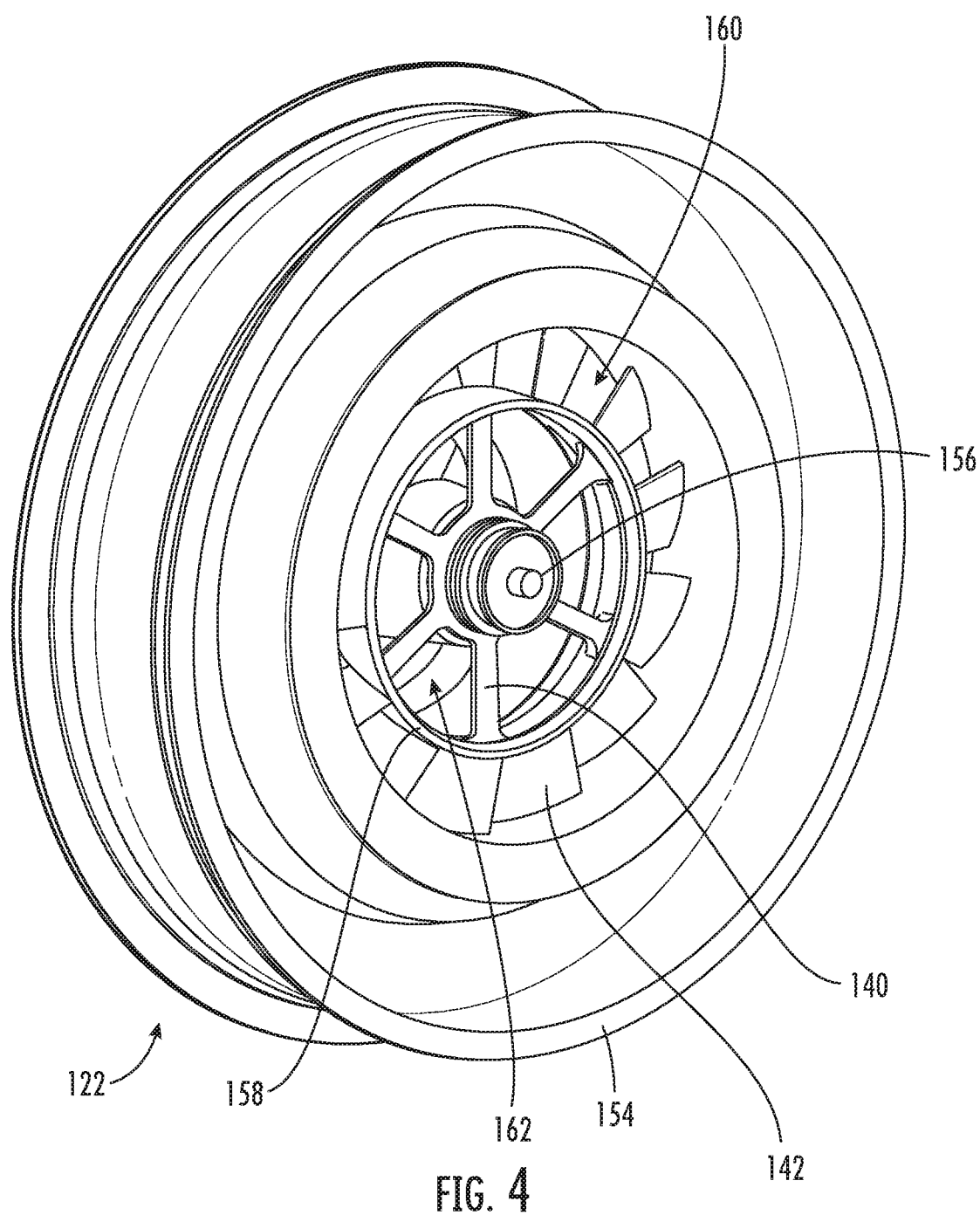
FIG. 4 is a perspective view of the ambient air fan for the air cycle machine of FIG. 1, showing the radially inner spoked portion of the ambient air fan connected to a radially outer bladed portion of the ambient air fan by an annular portion of the ambient air fan.

With reference to FIG. 4, the ambient air fan 122 includes a fan housing 154, a hub portion 156, the radially inner spoked portion 140, an annulus portion 158, and the radially outer bladed portion 142. The hub portion 156 is supported for rotation about the rotation axis 138 by the fan housing 154. The radially inner spoked portion 140 extends radially outward from the hub portion 156, is fixed in rotation relative to the hub portion 156 and connects the hub portion 156 to the annulus portion 158. The annulus portion 158 extends circumferentially about the radially inner spoked portion 140 and connects the radially inner spoked portion 140 to the radially outer bladed portion 142. The radially outer bladed portion 142 is connected to the annulus portion 158 and extends radially outward from the annulus portion 158 of the ambient air fan 122.

The fan housing 154 is seated in the housing 110, extends circumferentially about the radially outer bladed portion 142 of the ambient air fan 122 and defines an ambient air channel 160 and turbine exhaust channel 162. The ambient air channel 160 fluidly couples the ambient air inlet 134 of the housing 110 to the ambient air outlet 136 of the housing 110. The turbine exhaust channel 162 fluidly couples the scavenging turbine 120 to the ambient air outlet 136. It is contemplated that the radially outer bladed portion 142 of the ambient air fan 122 is rotatably disposed within the ambient air channel 160, radially inner spoked portion 140 of the ambient air fan 122 be rotatably disposed within the turbine exhaust channel 162, and that the annulus portion 158 of the ambient air fan 122 separate the ambient air channel 160 from the turbine exhaust channel 162.

With continuing reference to FIG. 3, operation the overboard air flow 26 enters the housing 110 through the overboard air inlet 132 and is communicated to the scavenging turbine 120 through the turbine chamber 150. The scavenging turbine 120 expands the overboard air flow 26, extracts work from the overboard air flow 26 as the overboard air flow 26 expands and communicates the overboard air flow 26 to the radially inner spoked portion 140 of the ambient air fan 122. It is contemplated that the work extracted by the scavenging turbine 120 be applied to the ambient air fan 122 by the shaft 124, which rotatably drives (rotates) the ambient air fan 122 within the fan chamber 152.

The ambient air flow 30 enters the housing 110 through the ambient air inlet 134. The ambient air inlet 134 communicates the ambient air flow 30 to the fan chamber 152, and therethrough to the radially outer bladed portion 142 of the ambient air fan 122, which drives the ambient air flow 30 to a location within the fan chamber 152 wherein the ambient air flow 30 intermixes with the overboard air flow 26. Once intermixed, the fan chamber 152 communicates the ambient air flow 30 and the overboard air flow 26 to ambient air outlet 136, through which the overboard air flow 26 and the ambient air flow 30 issue to the environment 20 external to the vehicle 10.

Figure 5:
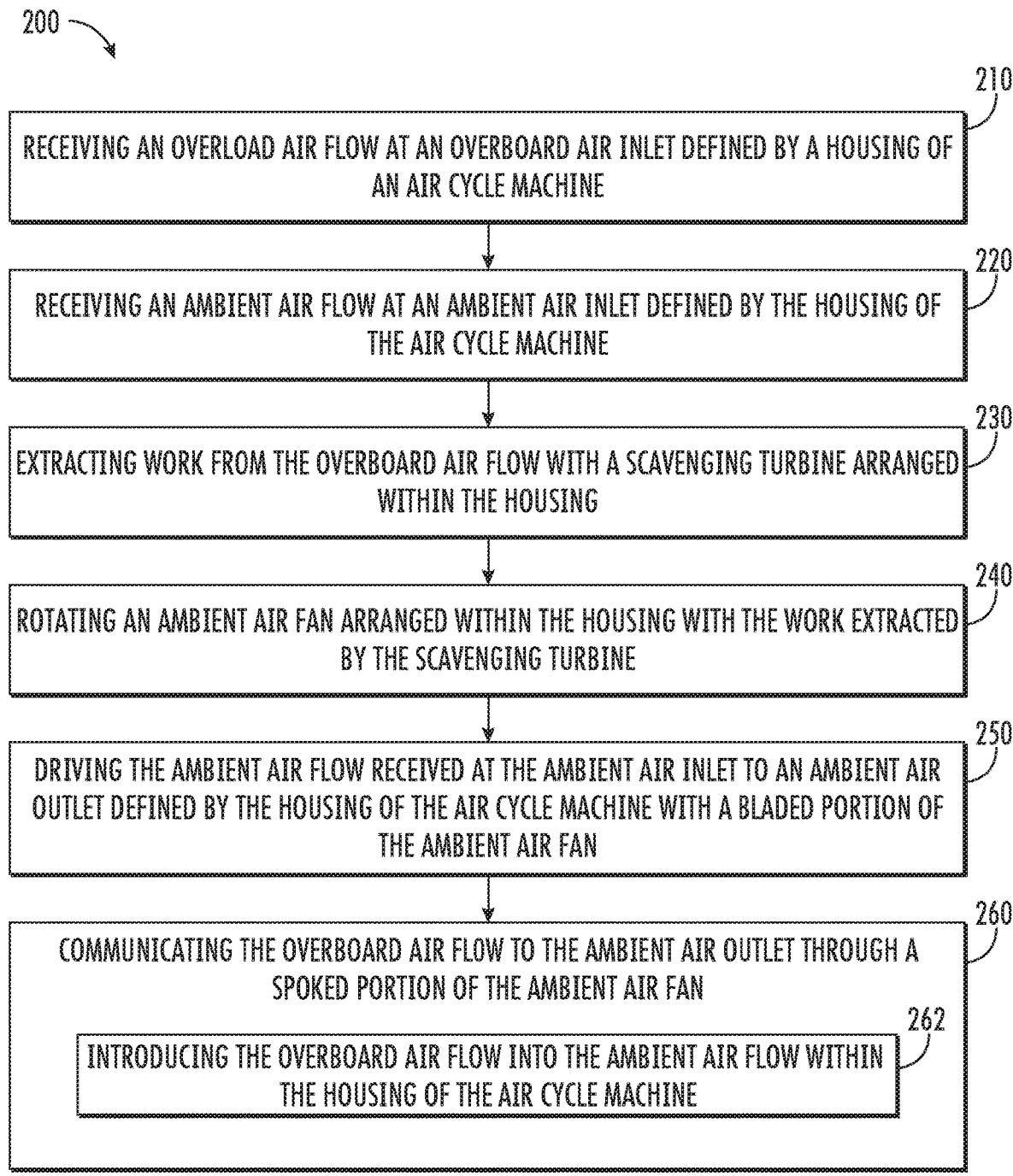
FIG. 5 is block diagram of method of communicating fluid within an air cycle machine, showing operations of the method according to an illustrative and non-limiting example of the method.

With reference to FIG. 5, a method 200 of communicating fluid within an air cycle machine, e.g., the air cycle machine 100, is shown. The method 200 includes receiving an overboard air flow, e.g., the overboard air flow 26 (shown in FIG. 2), at an overboard air inlet of a housing of the air cycle machine, e.g., at the overboard air inlet 132 (shown in FIG. 3) of the housing 110 (shown in FIG. 1), as shown with box 210. The method 200 also includes receiving an ambient air flow, e.g., the ambient air flow 30 (shown in FIG. 1), at an ambient air inlet of the housing, e.g., the ambient air inlet 134 (shown in FIG. 3), as shown with box 220.

As shown with box 230, work is extracted from the overboard air flow by a scavenging turbine arranged with the housing of the air cycle machine, e.g. the scavenging turbine 120 (shown in FIG. 2). It is contemplated that the work extracted from the overboard air flow by the scavenging turbine be applied (at least in part) an ambient air fan, e.g., the ambient air fan 122 (shown in FIG. 3), to drive the ambient air flow an ambient air outlet of the housing of the air cycle machine, e.g., the ambient air outlet 136 (shown in FIG. 3), as shown with box 250. As shown with box 260, the overboard air flow is communicated to the overboard air outlet through a spoked portion of the ambient air fan, e.g., the radially inner spoked portion 140 (shown in FIG. 3). It is contemplated that the overboard air flow be introduced into the ambient air flow within the housing, as shown with box 262, the air cycle machine having no external ducting fluidly coupling the scavenging turbine to the ambient air fan.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine, comprising:
a housing with an exterior wall defining therethrough an overboard air inlet, an ambient air inlet, and an ambient air outlet;
a scavenging turbine arranged within the housing and supported for rotation about a rotation axis and in fluid communication with the overboard air inlet; and
an ambient air fan arranged within the housing and supported for rotation about the rotation axis within the housing, the ambient air fan having a radially inner spoked portion and radially outer bladed portion, wherein the radially outer bladed portion fluidly couples the ambient air inlet to the ambient air outlet, and wherein the radially inner spoked portion fluidly couples the scavenging turbine to the ambient air fan within the housing.

2. The air cycle machine of claim 1, wherein the ambient air fan comprises an annular portion extending about the rotation axis, the radially outer bladed portion extending radially outward from the annular portion of the ambient air fan.

3. The air cycle machine of claim 1, further wherein the ambient air fan is fixed in rotation relative to the scavenging turbine.

4. The air cycle machine of claim 1, further comprising an overboard air duct connected to the overboard air inlet defined by the exterior wall of the housing.

5. The air cycle machine of claim 1, wherein the air cycle machine has no ducting external to the housing and fluidly coupling the scavenging turbine to the ambient air fan.

6. The air cycle machine of claim 1, wherein the scavenging turbine is a radial flow turbine, wherein the ambient air fan is an axial flow fan, and further comprising a bearing arrangement supporting the radial flow turbine and the axial flow fan for rotation about the rotation axis.

7. The air cycle machine of claim 1, further comprising a fan housing seated in the housing along the rotation axis and supporting the ambient air fan, the fan housing extending circumferentially about the radially outer bladed portion of the ambient air fan.

8. The air cycle machine of claim 7, wherein the fan housing defines an ambient air channel fluidly coupling ambient air inlet of the housing to the ambient air outlet of the housing, the radially outer bladed portion of the ambient air fan rotatably disposed within the ambient air channel.

9. The air cycle machine of claim 7, wherein the fan housing defines a turbine exhaust channel fluidly coupling the scavenging turbine to the ambient air outlet, the radially inner spoked portion of the ambient air fan rotatably disposed within the turbine exhaust channel.

10. The air cycle machine of claim 1, wherein the housing has an interior wall defining therethrough a turbine-fan port, the turbine-fan port fluidly coupling the scavenging turbine to the ambient air fan.

11. The air cycle machine of claim 10, wherein the interior wall divides an interior of the housing into a turbine chamber and a fan chamber, the turbine-fan port fluidly coupling the turbine chamber with the fan chamber.

12. The air cycle machine of claim 11, wherein the scavenging turbine is arranged within the turbine chamber.

13. The air cycle machine of claim 11, wherein the ambient air fan is arranged within the fan chamber.

14. The air cycle machine of claim 1, further comprising a shaft arranged within the housing and connecting the scavenging turbine to the ambient air fan.

15. The air cycle machine of claim 14, further comprising an expansion turbine arranged in the housing and fixed in rotation relative to the ambient air fan by the shaft.

16. The air cycle machine of claim 14, further comprising a compressor arranged within the housing and fixed in rotation relative to the ambient air fan by the shaft.

17. An environmental control system, comprising:
an air cycle machine as recited in claim 1, wherein the housing has an interior wall defining therethrough a turbine-fan port, the turbine-fan port fluidly coupling the scavenging turbine to the ambient air fan; and
wherein the air cycle machine has no ducting external to the housing fluidly coupling the scavenging turbine to the ambient air fan.

18. The environmental control system of claim 17, further comprising:
an expansion turbine arranged in the housing and fixed in rotation relative to the ambient air fan; and
a compressor arranged within the housing and fixed in rotation relative to the ambient air fan.

19. The environmental control system of claim 17, further comprising:
an environmentally controlled space fluidly coupled to the overboard air inlet defined by the housing of the air cycle machine; and
a compressed air source fluidly coupled by the environmentally controlled space by the overboard air inlet.

20. A method of communicating fluid within an air cycle machine, comprising:
at an air cycle machine including a housing with an exterior wall defining therethrough an overboard air inlet, an ambient air inlet, and an ambient air outlet; a scavenging turbine arranged within the housing and supported for rotation about a rotation axis and in fluid communication with the overboard air inlet; and an ambient air fan arranged within the housing and supported for rotation about the rotation axis within the housing, the ambient air fan having a radially inner spoked portion a and radially outer bladed portion, the radially outer bladed portion fluidly coupling the ambient air inlet to the ambient air outlet, the radially inner spoked portion fluidly coupling the scavenging turbine to the ambient air fan within the housing;
receiving an overboard air flow at the overboard air inlet;
receiving an ambient air flow at the ambient air inlet;
extracting work from the overboard air flow with the scavenging turbine;
rotating the ambient air fan with the work extracted by the scavenging turbine;
driving the ambient air flow received at the ambient air inlet to the ambient air outlet with the radially outer bladed portion of the ambient air fan; and
communicating the overboard air flow to the ambient air outlet through the radially inner spoked portion of the ambient air fan.

* * * * *